Nov. 1, 1932.  E. G. BODEN  1,885,980

PROCESS OF ASSEMBLING ROLLER BEARINGS

Filed Dec. 15, 1930

INVENTOR:
Ernest G. Boden,
by Cauflan & Gravely,
HIS ATTORNEYS.

Patented Nov. 1, 1932

1,885,980

UNITED STATES PATENT OFFICE

ERNEST G. BODEN, OF CANTON, OHIO, ASSIGNOR TO THE TIMKEN ROLLER BEARING COMPANY, OF CANTON, OHIO, A CORPORATION OF OHIO

PROCESS OF ASSEMBLING ROLLER BEARINGS

Application filed December 15, 1930. Serial No. 502,380.

My invention relates to roller bearings, particularly conical roller bearings, of the type in which the cup or outer bearing member has a thrust rib at one end; and it has for its principal object to dispense with the cage usually required in such construction and, at the same time, to make a self-contained unit of the rollers and bearing cup, thereby facilitating assembling of the bearings. It has for a further object the process of assembling rollers in a ribbed bearing cup. The invention consists in the process of mounting bearing rollers in a ribbed bearing cup so as to completely fill the cup and to make up a self-contained unit with the cup. The invention further consists in the process of assembling roller bearings hereinafter described and claimed.

The roller bearing disclosed herein is the subject matter of a co-pending divisional application of this application, Serial No. 579,911, filed December 9, 1931.

Figure 1:
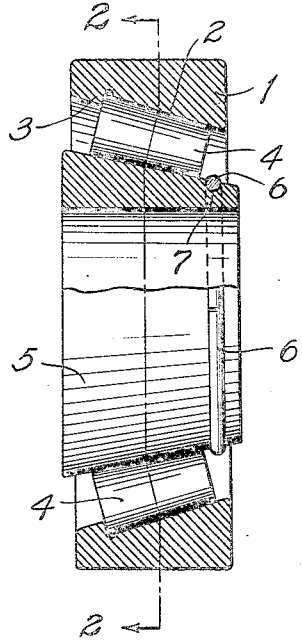
Figure 2:
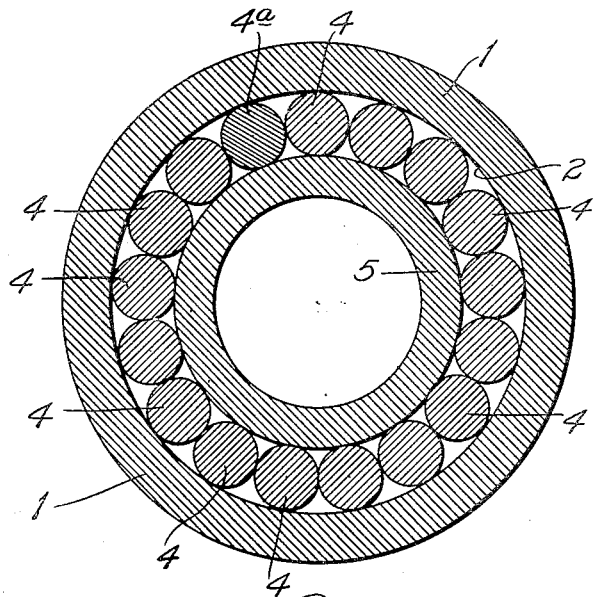
Figure 3:
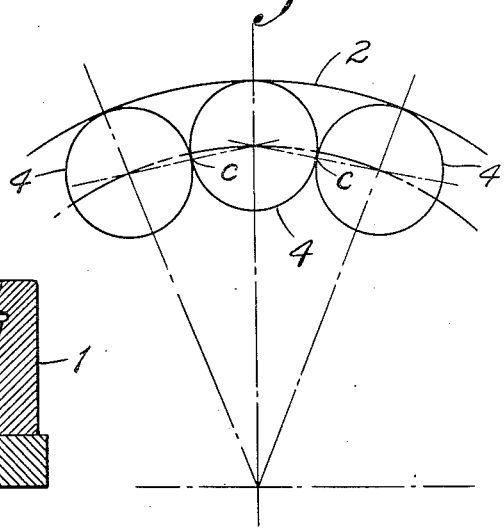
Figure 4:
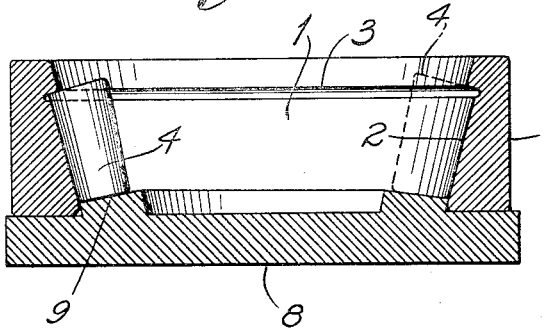

In the accompanying drawing,

Fig. 1 is a longitudinal sectional view of a roller bearing embodying my invention, Fig. 2 is a sectional view on the line 2—2 of Fig. 1, Fig. 3 is a longitudinal sectional view showing the outer bearing member and an assembling plate and indicating the process of assembling the rollers; and Fig. 4 is a diagrammatic view indicating how the rollers are held in the outer bearing member without a cage.

The drawing illustrates a bearing including a cup or outer bearing member 1 having a conical raceway 2 and a thrust rib 3 at the large end of said raceway, conical rollers 4 and a conical inner bearing member or cone 5 provided with a split ring 6 mounted in a groove 7 at its small end to hold the cone in position, but permit its removal if desired.

The usual cage is dispensed with and adjacent rollers 4 make full contact with each other on their sides. As appears from the diagrammatic view, the contact points C between the rollers are located radially inward of the circle passing through the axes of the rollers; and movement of a roller radially inward of the bearing is prevented. Thus, assembly of the bearing is facilitated and wabbling of the rollers of the assembled bearing prevented.

In assembling the bearing, a bearing plate 8 is disposed at the end of the cup with an annular flange 9 projecting into the bore of the cup, the face of said flange 9 being inclined toward the raceway 2 of the cup. The rollers 4 are mounted against the raceway in the space between said flange 9 and the thrust rib 3 of the cup, said rollers being selected with reference to the size of the bore of the cup and being arranged so that the rollers contact with each other and that the last roller 4a to be mounted in the cup is of such size that it must be snapped into place; with the result that the circular series of rollers is self-contained with respect to the cup, and the assembled cup and rollers may be removed from the assembling plate 8. The cone or inner bearing member 5 is then inserted into the series of rollers 4 and the retaining ring 6 placed thereon.

In the drawing, one roller 4a is arbitrarily designated as the last roller, it being understood that any other roller might be the last one to be positioned. In each case the last roller to be positioned is of a size that will require to be snapped into place (whether the same size as other rollers or larger or smaller) after which all rollers will be held in place.

The above described bearing dispenses with the cage usually required and it provides the maximum number of rollers in the bearing, thereby increasing the load carrying capacity of the bearing. Assembly of the bearing is facilitated by reason of the rollers being self-contained with the cup. Since the rollers make full line contact with each other, play and wabbling of the rollers are minimized, thereby making the bearing run true.

What I claim is:

1. The process of assembling rollers in an outer bearing member having a conical bore and a thrust rib at the large end of said bore, which consists in arranging a circular series of rollers in said bore with their ends against said thrust rib and selecting the last roller of the series of a size to require snapping into place, thereby making the rollers self-contained in the cup.

2. The process of assembling rollers in an outer bearing member having a conical bore and a thrust rib at the large end of said bore, which consists in placing at the end of said bearing member an assembling plate having a flange extending into the bore of said bearing member, the face of said flange being inclined toward said bearing member, arranging a circular series of rollers in said bore between said thrust rib and said flange and selecting the last roller of the series of a size to require snapping into place, thereby making the rollers self-contained in the cup.

Signed at Canton, Ohio, this 29 day of Nov. 1930.

ERNEST G. BODEN.